United States Patent [19]

Berger et al.

[11] 3,989,880

[45] *Nov. 2, 1976

[54] CATALYST AND PROCESS FOR THE POLYMERIZATION OF OLEFINS

[75] Inventors: Eugene Berger, Brussels; Pol Gérard, Braine-l'Alleud; André Delbouille; Jean-Louis Derroitte, both of Brussels, all of Belgium

[73] Assignee: Solvay & Cie, Belgium

[*] Notice: The portion of the term of this patent subsequent to Nov. 2, 1993, has been disclaimed.

[22] Filed: Feb. 11, 1972

[21] Appl. No.: 225,651

Related U.S. Application Data

[63] Continuation-in-part of Ser. No. 118,998, Feb. 25, 1971, which is a continuation of Ser. No. 676,738, Oct. 20, 1967, abandoned.

[30] Foreign Application Priority Data

Feb. 18, 1971  France .............................. 71.05656

[52] U.S. Cl. ............................. 526/124; 252/429 C; 252/431 N; 526/114; 526/115; 526/121; 526/352
[51] Int. Cl.$^2$ ...................... C08F 4/02; C08F 10/02
[58] Field of Search ..................... 252/429 C, 431 N; 260/93.7, 88.2, 94.9 DA, 94.9 E; 526/124, 114, 115, 121

[56] References Cited

UNITED STATES PATENTS 3,642,760   2/1972   Baekelmans et al. ........ 260/94.9 DA

FOREIGN PATENTS OR APPLICATIONS

| 7,000,094 | 7/1970 | Netherlands ................ 260/94.9 DA |
| 1,140,649 | 1/1969 | United Kingdom ......... 260/94.9 DA |
| 884,249 | 12/1961 | United Kingdom ............ 260/94.9 E |
| 837,251 | 6/1960 | United Kingdom ............ 260/94.9 E |
| 1,212,320 | 11/1970 | United Kingdom ......... 260/94.9 DA |

*Primary Examiner*—Edward J. Smith
*Attorney, Agent, or Firm*—Pennie & Edmonds

[57] ABSTRACT

This invention relates to the polymerization and copolymerization of α-olefins and to catalysts and cocatalysts for that purpose wherein the polymerization is carried out in the presence of a catalyst composition comprising an organometallic compound and the cocatalyst reaction product of a halogenated transition metal compound and an organic compound of a divalent metal containing oxygen and nitrogen and being substantially free from hydroxyl groups attached to the divalent metal.

9 Claims, No Drawings

CATALYST AND PROCESS FOR THE POLYMERIZATION OF OLEFINS

CROSS REFERENCE TO RELATED APPLICATIONS

The instant application is a continuation-in-part of applicaton Ser. No. 118,998, filed Feb. 25, 1971, which, in turn, is a continuation of application Ser. No. 676,738, filed Oct. 20, 1967, now abandoned.

BACKGROUND OF THE INVENTION

In British patent No. 1,140,649 of the 17th Oct. 1967 there is described a process for the polymerization and copolymerization of olefins, in which the operation is carried out in the presence of a catalyst obtained by activating by means of an organo-metallic compound the product of the reaction between a halogenated derivative of a transition metal and a solid support consisting of an oxygenated compound of a divalent metal free from hydroxyl groups.

During the reaction of the halogenated derivative and the solid support, complexes are formed containing halogen, divalent metal and transition metal. It is observed that a superficial halogenation of the solid support takes place. However, this halogenation is generally weak; the total quantity of halogen present is often less than 0.05 atoms of halogen per atom of divalent metal.

SUMMARY OF THE INVENTION

The applicants have now found that when particular solid supports are used the halogenation is much greater and one obtains divalent metal/transition metal/halogen complexes which are much more productive.

The present invention relates to a process for the polymerization and co-polymerization of α-olefins in which the operation is carried out in the presence of a catalyst obtained by the activation by means of an organo-metallic compound of the cocatalyst product of the reaction between a halogenated derivative of a transition metal and a solid support consisting of an organic compound of a divalent metal containing oxygen and nitrogen which is free from hydroxyl groups attached to the divalent metal.

DETAILED DESCRIPTION

In the present invention the term "organic compounds of divalent metals containing oxygen and nitrogen" is intended to mean all organic compounds which possess in their molecule divalent metal/oxygen/nitrogen/carbon bonds. Although all organic compounds of divalent metals containing oxygen and nitrogen are suitable, it is preferable to use those of magnesium, calcium, zinc, manganese, iron, nickel, cobalt and tin, with best results being obtained with magnesium.

The organic compounds containing oxygen and nitrogen may also be of any type. However, it is preferred to use those compounds having carbon radicals attached to the divalent metal via the nitrogen and the oxygen which contain from 1 to 20 carbon atoms and preferably from 1 to 6 carbon atoms. These radicals may be saturated or unsaturated, branched-chained, straight-chained or cyclic, and they may also be substituted. They are chosen in particular from among the alkyl, alkenyl, aryl, cycloalkyl, arylalkyl, alkylaryl, acyl, aroyl radicals and their substituted derivatives.

Among the organic compounds of divalent metals containing oxygen and nitrogen which are suitable for the process of the invention one may mention in particular the salts of oximes such as butyl oximates, dimethyl glyoximates and cyclohexyl oximates. One may also mention the salts of hydroxamic acids and the salts of alkyl-substituted or aryl-substituted hydroxylamine as well as the substituted derivatives of these compounds.

Also suitable are the organic compounds of divalent metals containing oxygen and nitrogen comprising other radicals attached to the magnesium besides the carbon radicals attached via nitrogen and oxygen. Among these other radicals one may mention the halide radicals, the radicals derived from inorganic acids such as sulphate, nitrate, phosphate or carbonate radicals, the radicals derived from carboxylic organic acids such as butanoate, benzoate or adipate radicals, the radicals derived from alcohols such as the methanolate, ethanolate and cyclohexanolate radicals and the radicals derived from phenates such as cresolate radicals. However, it is preferable to use compounds containing at least one divalent metal/oxygen/nitrogen/carbon bond per atom of divalent metal.

Also suitable are the chelated organic compounds of divalent metals containing oxygen and nitrogen having the same type of bonds, such as the derivatives of N-nitroso-N-phenyl-hydroxylamine (cuxferon).

The organic compounds containing oxygen and nitrogen suitable for carrying out the invention must be substantially free from hydroxyl groups attached to the divalent metal. They must preferably contain less than 0.1 hydroxyl group per atom of divalent metal. However, hydroxyl groups attached to the nitrogen or to the carbon radical and which have not fixed any divalent metal are not harmful and are not taken into account when determining whether the organic compound containing oxygen and nitrogen is free from hydroxyl groups.

The particle size of the solid support is not critical. For reasons of convenience, however, it is preferable to use particles whose mean diameter is between 1 and 500 microns and more preferably between 40 and 200 microns.

The catalysts of the invention comprise catalytic complexes obtained by reacting the solid support with a halo-genated derivative of a transition metal. The term "transition metal" is meant to denote a metal of Groups, IVB, VB or VIB of the Periodic Table. As halogenated derivative one may use a halide, an oxyhalide, or an alkoxyhalide. It is preferred to use brominated and chlorinated derivatives of titanium, zirconium, vanadium and chromium such as $TiCl_4$, $TiBr_4$, $VCl_4$, $VOCl_3$, $VOBr_3$, $CrO_2Cl_2$, $Ti(OC_2H_5)_3Cl$, $Ti(OiC_3H_7)_2 Cl_2$ and $Ti(OiC_3H_7)Cl_3$, with best results obtained with $TiCl_4$. When one uses derivatives containing alkoxide radicals they are preferably chosen from among those whose alkoxide radicals, whether straight or branched, contain from 1 to 20 carbon atoms and more particularly from 1 to 10 carbon atoms.

The reaction of the solid support with the halogenated derivative may be carried out by any method. The halogenated derivative may be used in the form of vapor or in the form of a gas which may be diluted by an inert gas, in the liquid form or in the form of a solution. As solvent one generally uses the diluents generally employed in the low-pressure polymerization of olefins. When one operates in solution, it is preferred to use high concentrations of halogenated derivative (preferably more than 50% by weight). A particularly convenient method of procedure consists in bringing the solid support into contact with the pure halogenated derivative maintained in the liquid state. One may, for example, suspend the solid support in the halogenated derivative or else wash the solid support with the halogenated derivative.

The temperature and the pressure at which this reaction is carried out are not critical. Generally speaking, for reasons of convenience, one operates at atmospheric pressure and at a temperature of between 0° and 300° C., preferably between 20° and 150° C. The reactants are maintained in the presence of one another for a period which is sufficient for the catalytic complex to be formed. Generally speaking this is formed within an hour.

After the reaction, the catalytic complex, which is also solid, is recovered separately. It may be extracted by means of the same halogenated derivative which was used in the reaction and which is maintained in the liquid state. It is then generally washed with an inert hydrocarbon solvent so as to eliminate the excess reactants.

The elemental analysis of the catalytic complexes thus obtained shows that they are in fact chemically combined complexes produced by chemical reactions and not the result of mixtures or adsorption phenomena. In point of fact it is impossible to dissociate the transition metal derivative from these complexes using purely physical methods of separation.

These complexes comprise the divalent metal, the transistion metal and the halogen. The quantity of halogen present is large. Analysis shows in fact that the atomic ratio of halogen to transition metal is higher than the figure in the initial halogenated derivative. Thus, when one starts off from $TiCl_4$, the Cl/Ti atomic ratio is greater than 4. Furthermore, the atomic ratio of halogen/divalent metal is also high. Generally speaking it is higher than 0.5 and more often than not it is higher than 1. The high content of halogen of the catalytic complexes of the invention seems to be the result of the reaction of gaseous byproducts of the reaction of the halogenated derivative with the solid support (mainly hydrogen halide). It is therefore essential not to take any steps aimed at eliminating these gaseous byproducts from the reaction medium, because if one does one does not obtain the extremely active catalytic complexes of the invention.

The catalysts according to the present invention also comprise an organo-metallic compound which acts as activator. One uses the organic compounds of the metals of Groups IA, IIA, IIB, IIIA and IVA of the Periodic Table, such as the organic compounds of lithium, magnesium, zinc, aluminium or tin. The best results are obtained with the organic compounds of aluminium.

It is possible to use totally alkylated compounds whose alkyl chains from 1 to 20 carbon atoms and which may be straight or branched, such as for example n-butyl lithium, diethyl magnesium, diethyl zinc, trimethyl aluminium, triethyl aluminium, tri-isobutyl aluminium, tri-n-butyl aluminium, tri-n-decyl aluminium, tetraethyl tin and tetrabutyl tin.

It is also possible to use metallic alkyl hydrides in which the alkyl radicals also contain from 1 to 20 carbon atoms, such as di-isobutly aluminium hydride and trimethyl tin hydride. Also suitable are the alkyl halides of metals in which the alkyl radicals also contain from 1 to 20 carbon atoms such as ethyl aluminium sesquichloride, diethyl aluminium chloride and diisobutyl aluminium chloride.

Finally it is also possible to use organo-aluminium compounds obtained by reacting trialkyl aluminiums or dialkyl aluminium hydrides whose radicals contain 1 to 20 carbon atoms with diolefins containing 4 to 20 carbon atoms, and more particularly the compounds known as isoprenyl aluminiums.

The process of the invention is applied to the polymerization of olefins with a terminal unsaturation whose molecule contains 2 to 20 and preferably 2 to 6 carbon atoms, such as ethylene, propylene, butene-1, 4-methylpentene-1 and hexene-1. It is also applied to the co-polymerization of these olefins with one another and also with diolefins preferably containing from 4 to 20 carbon atoms and as used herein the phrase "polymerization and co-polymerization of $\alpha$-olefins" is intended to include such copolymerization. These diolefins may be unconjugated aliphatic diolefins such as hexadiene-1,4, unconjuaged monnocyclic diolefins such as hexadiene- -1,4 unconjugated monocyclic diolefins such as 4-vinylcyclohexene, 1,3-divinylcyclohexane, cyclopentadiene-1,4 or cyclo-octadiene-1,5,alicyclic diolefins having an endocyclic bridge such as dicyclopentadiene or norbornadiene and conjugated aliphatic diolefins such as butadiene and isoprene.

The process of the invention is applied particularly well to the manufacture of homopolymers of ethylene and co-polymers containing at least 90 moles per cent and preferably 95 moles per cent of ethylene.

The polymerization may be carried out by any known process: in solution or in suspension in a solvent or hydrocarbon diluent or further in the gaseous phase. For processes in solution or in suspension one uses solvents or diluents annalogous to those employed for the washing of the catalytic complex. These are preferably aliphatic or cycloaliphatic hydrocarbons such as butane, pentane, hexane, heptane, cyclohexane, methylcyclohexane or mixtures thereof. It is also possible to carry out the polymerization in the monomer or one of the monomers maintained in the liquid state.

The polymerization pressure is generally between atmospheric pressure and 100 kg/cm², preferably 50 kg/cm².

The temperature is generally chosen between 20 and 200° C. and preferably between 60° and 120° C. The polymerization may be carried out continuously or batchwise.

The organo-metallic compounds and the catalytic complex may be added separately to the polymerization medium. It is also possible to bring them into contact at a temperature between −40° and 80° C. for a period of time which may range up to 2 hours prior to introducing them into the polymerization reactor. It is also possible to bring them into contact in several stages or again to add a part of the organo-metallic compound before the reaction or again to add a number of different organo-metallic compounds.

The total quantity of organo-metallic compound used is not critical; it is generally between 0.02 and 50 moles per dm³ of solvent, diluent or reactor volume and preferably between 0.2 and 5 moles/dm 3.

The quantity of catalytic complex used is determined according to the transition metal content of the complex. It is generally selected so that the concentration is between 0.001 and 2.5 and preferably between 0.01 and 0.25 m-gram-at. of metal per dm³ of solvent, diluent or reactor volume.

The ratio of the quantities of organo-metallic compound and catalytic complex is not critical either. It is generally chosen so that the ratio of organo-metallic compound/transition metal expressed in moles/gram atoms is greater than 1 and preferably greater than 10.

The mean molecular weight, and consequently the melt index of the polymers made according to the process of the invention, may be regulated by the addition to the polymerization medium of one or more molecular weight modifier agents such as hydrogen, zinc or diethyl cadmium, alcohols or carbon dioxide.

The specific gravity of the homopolymers made by the process of the invention may also be regulated by the addition to the polymerization medium of an alkoxide of a metal of Groups IVa and Va of the Periodic Table. Thus it is possible to manufacture polyethylenes with a specific gravity intermediate between that of the polyethylenes made by the high-pressure process and that of the classic high-density polyethylenes.

Among the alkoxides which are suitable for this regulation, those of titanium and vanadium whose radicals contain 1 to 20 carbon atoms each are particularly effective. One may mention among them $Ti(OCH_3)_4$, $Ti(OC_2H_5)_4$, $Ti[OCH_2CH(CH_3)_2]_4$, $Ti(OC_8H_{17})_4$ and $Ti(OC_{16}H_{33})_4$.

The process of the the invention makes its possible to manufacture polyolefins with remarkably high productivities. Thus, in the homopolymerization of ethylene, the productivity expressed in grams of polyethylene per gram of catalytic complex exceeds 2000 in certain cases. Thanks to these high productivities and also to the fact that the transition metal content of the catalytic complexes is relatively low, the polymers no longer have to be purified.

In the polymers manufactured according to the process of the invention, the residual content of transition metals is particularly low. In general it is less than 20 ppm. Now it is the derivatives of these metals which are troublesome in catalytic residues principally because of the colored complexes which they form with the phenolic anntioxidants usually employed in these polyolefins. One may therefore do away with the purification operation when finishing the polymer and achieve a very appreciable economy.

The polyolefins manufactured by the process of the invention are well suited for the usual applications of polyolefins, such as injection, extrusion, extrusion blowing, etc.

The examples which follow are aimed at illustrating and not in any way restricting the invention.

EXAMPLE 1

5 g of $Mg(ONC_4H_8)_2$ (magnesium butyl oximate) are suspended in 25 mls. of pure $TiCl_4$ and the suspension is brought to 130° C. The whole is maintained under strong agitation at this temperature for one hour. The solid complex which is the reaction product of $Mg(ONC_4H_8)_2$ with $TiCl_4$, is separated by filtration and is washed with hexane until all traces of $TiCl_4$ in the washing solvent have disappeared. It is then dried under a current of dry nitrogen at 40° C. for 16 hours.

The elemental analysis of the catalytic complex shows that it contains 203 g of magnesium, 45 g of titanium and 676 g of chlorine per kg. The atomic ratio Cl/Ti is therefore 20.2 and the atomic ratio Cl/Mg is approximately 2.3.

63 mg of catalytic complex and 200 mg of tri-isobutyl aluminium are introduced in the form of a 40-g/litre solution in hexane into a 1-litre flask. The whole is maintained at 80° C. for 10 minutes. Then the whole is transferred to a 3-litre stainless steel autoclave containing 1 litre of hexane. The temperature of the autoclave is brought to approximately 80° C. Ethylene is introduced under a partial pressure of 10 kg/cm² and hydrogen under a partial pressure of 4 kg/cm².

The polymerization is continued for 1 hour, while maintaining the pressure constant by the continued addition of ethylene. After one hour the autoclave is de-gassed and 140 g of polyethylene are collected.

The hourly productivity is therefore 2200 g polyethylene per g of catalytic complex. The specific activity of the catalytic complex reckoned on the weight of titanium used and 1 kg/cm² of ethylene is 5000 g polyethylene/hr. g Ti. kg/cm² $C_2H_4$ approx.

The polyethylene obtained possesses a melt index, measured by standard ASTM D 123-57 T of 0.33 g/10 mins.

EXAMPLE 2

5 g of magnesium dimethyl glyoximate are suspended in 25 mls. of pure $TiCl_4$ and the preparation of the catalytic complex is continued as in Example 1.

The elemental analysis of the catalytic complex obtained shows that it contains 201 g of magnesium, 39 g of titanium and 665 g of chlorine per kg. The atomic ratio Cl/Ti is therefore 23.1 and the atomic ratio Cl/Mg is 2.4 approx.

One then carries out a polymerization reaction as in Example 1, except that one uses 18 mg of catalytic complex. The polymerization is stopped after 0.5 hour. One collects 141 g of polyethylene.

The hourly productivity is therefore 15,700 g polyethylene/g of catalytic complex.

The specific activity is 40,500 g polyethylene/hr. g Ti. kg/cm² $C_2H_4$ approx.

The polyethylene obtained possesses a melt index of 0.83 g/10 mins.

EXAMPLE 3

5 g of the magnesium salt of N-nitroso-N-phenylhydroxylamine cup-feronate of the formula $Mg[ON(NO)C_6H_5]_2$ are suspended in 25 mls. of $TiCl_4$ and the preparation of the catalytic complex is continued as in Example 1.

The elemental analysis of the catalytic complex obtained shows that it contains 180 g of magnesium, 42 g of titanium and 670 g of chlorine per kg. The atomic ratio of Cl/Ti is therefore 21.6 and the Cl/Mg ratio is approx. 2.5.

One then carries out a polymerization reaction as in Example 1, except that one uses 9 mg. of catalytic complex. After one hour one collects 202 g of polyethylene.

The hourly produxtivity is therefore 22,400 g polyethylene/g catalytic complex and the specific activity is 54,000 g polyethylene/hr g Ti. Kg/cm² $C_2H_4$ approx.

The polyethylene obtained possesses a melt index of 0.68 g/10 mins.

EXAMPLE 4

The procedure of Example 1 is followed except that for the magnesium butyl oximate used therein there is substituted an equal amount, separately, and in turn, of magnesium cyclohexyl oximate, magnesium hydroxamate, zinc butyl oximate, and tin dimethyl glyoximate. In each case suitable catalytic complexes are formed which yield high amounts of polyethylene per gram of catalytic complex with best results obtained with the magnesium salts.

It will be understood that it is intended to cover all changes and modifications of the disclosure of the invention herein chosen for the purpose of illustration which do not constitute departures from the spirit and scope of the invention.

What is claimed is:
1. A process for the polymerization and copolymerization of α-olefins which comprises conducting the polymerization or copolymerization in the presence of a catalyst composition comprising:
   A. the reaction product of (1) a solid organic compound of a divalent metal containing at least one metal to oxygen to nitrogen bond and being substantially free from hydroxyl groups attached to the divalent metal, and (2) a halogenated derivative selected from the group consisting of halides, oxyhalides and alkoxyhalides of a transition metal of Groups IVB, VB and VIB Of the Periodic Table; and
   B. an organometallic compound having a metal selected from Groups IA, IIA, IIB, IIIA, and IVA of the Periodic Table wherein said reaction product has a halogen/transition metal ratio greater than 4 and an atomic ratio of halogen/divalent metal greater than 0.5.
2. The process according to claim 1, wherein the divalent metal is selected from the group consisting of magnesium, calcium, zinc, manganese, tin, iron, nickel and cobalt.
3. The process according to claim 1 wherein the solid organic compound has at least one divalent metal to oxygen to nitrogen to carbon bond per atom of divalent metal.
4. The process according to claim 1 wherein the solid organic compound has a $C_1 - C_{20}$ radical attached to the nitrogen of the nitrogen and oxygen bond of the divalent metal.
5. The process according to claim 1, wherein the solid organic compound is selected from the group consisting of the magnesium salts of oximes, hydroxamic acids, and alkyl and aryl-substituted hydroxylamine.
6. The process according to claim 1, wherein the halogenated transition metal derivative is a chlorinated derivative of titanium and the organometallic compound is an organoaluminum compound.
7. A catalyst composition for the low pressure polymerization and copolymerization of α-olefins comprising:
   A. the reaction product of (1) a solid organic compound of a divalent metal containing at least one metal oxygen to nitrogen bond and being substantially free from hydroxyl groups attached to the divalent metal, and (2) a halogenated derivative selected from the group consisting of halides, oxyhalides, and alkoxyhalides of a transition metal of Groups IVB, VB and VIB of the Periodic Table; and
   B. an organometallic compound having a metal selected from Groups IA, IIA, IIB, IIIA and IVA of the Periodic Table wherein said reaction product has a halogen/transition metal ratio greater than 4 and an atomic ratio of halogen/divalent metal greater than 0.5.
8. The catalytic composition of claim 7 wherein the solid organic compound is selected from the group consisting of the magnesium salts of oximes, hydroxamic acids, and alkyl and aryl-substituted hydroxylamine, and the reaction product has a halogen/transition metal ratio greater than 4 and an atomic ratio of halogen/divalent metal greater than 0.5.
9. The process according to claim 3 wherein the divalent metal is magnesium.

* * * * *

UNITED STATES PATENT AND TRADEMARK OFFICE
CERTIFICATE OF CORRECTION

PATENT NO. : 3,989,880
DATED : November 2, 1976
INVENTOR(S) : Berger et al.

It is certified that error appears in the above-identified patent and that said Letters Patent are hereby corrected as shown below:

Column 3, line 47, for "halo-genated" substitute --halogenated--.
Column 3, line 59, after "chains" insert --contain--;
line 67, for "di-isobutly" substitute --di-isobutyl--.
Column 4, line 23, for "monnocyclic" substitute --monocyclic--;
lines 23 and 24, delete "such as...diolefins";
line 37, for "annalogous" substitute --analogous--;
line 62, for "50 moles" substitute --50 mmoles--;
line 64, for "5 moles/dm3" substitute --5 mmoles/dm$^3$--.
Column 5, line 28, for "its" substitute --it--;
line 43, for "anntioxidants" substitute --antioxidants--.
Column 6, line 20, for "ASTM D 123-57 T" substitute --ASTM D 1238-57 T--;
line 45, for "cup-feronate" substitute --(cupferonate)--.

Signed and Sealed this

Nineteenth Day of April 1977

[SEAL]

Attest:

RUTH C. MASON
Attesting Officer

C. MARSHALL DANN
Commissioner of Patents and Trademarks

UNITED STATES PATENT OFFICE
CERTIFICATE OF CORRECTION

Patent No. 3,989,880  Dated November 2, 1976

Inventor(s) Eugene Berger et al.

It is certified that error appears in the above-identified patent and that said Letters Patent are hereby corrected as shown below:

Column 2, line 28, "(cuxferon)" should read --- (cupferon) ---.

Signed and Sealed this nineteenth Day of July 1977

[SEAL]

Attest:

RUTH C. MASON
Attesting Officer

C. MARSHALL DANN
Commissioner of Patents and Trademarks